US011321758B1

(12) United States Patent
Kwatra et al.

(10) Patent No.: US 11,321,758 B1
(45) Date of Patent: May 3, 2022

(54) SYNCHRONIZING ONLINE AND RETAIL SHOPPING EXPERIENCES FOR LIMITED STOCK PRODUCTS

(71) Applicant: International Business Machines Corporation, Armonk, NY (US)

(72) Inventors: Shikhar Kwatra, San Jose, CA (US); Sarbajit K. Rakshit, Kolkata (IN); Jeremy R. Fox, Georgetown, TX (US); Sushain Pandit, Austin, TX (US); Zachary A. Silverstein, Jacksonville, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/084,976

(22) Filed: Oct. 30, 2020

(51) Int. Cl.
*G06Q 30/00* (2012.01)
*G06Q 30/06* (2012.01)
(Continued)

(52) U.S. Cl.
CPC ..... *G06Q 30/0623* (2013.01); *G02B 27/0093* (2013.01); *G06F 3/013* (2013.01);
(Continued)

(58) Field of Classification Search
CPC ............. G06Q 30/0623; G06Q 10/087; G06Q 30/0202; G06Q 30/0633; G06Q 30/0639;
(Continued)

(56) References Cited

U.S. PATENT DOCUMENTS

| 8,401,914 B1 * | 3/2013 | Kim ....................... G06Q 30/06 705/26.1 |
| 9,449,343 B2 | 9/2016 | Mayerle et al. |

(Continued)

FOREIGN PATENT DOCUMENTS

KR 20160038662 A 4/2016

OTHER PUBLICATIONS

Augmented Reality in Logistics, http://www.dhl.com/content/dam/downloads/g0/about_us/logistics_insights/csi_augmented_reality_report_290414.pdf, 2014, 28 pages.
(Continued)

*Primary Examiner* — Meredith A Long
(74) *Attorney, Agent, or Firm* — Cantor Colburn LLP; Erik Johnson

(57) ABSTRACT

Aspects include synchronizing online and retail shopping experiences for limited stock products. A non-limiting example computer-implemented method includes receiving, by an item tracking system, a request for a status of an item in a retail store, the request received from a user device of an in-person shopper located in the retail store, the status indicating whether the item is currently available for purchase by the in-person shopper. It is determined, by the item tracking system, the status of the item, the determining is based at least in part on whether an action was taken by an online shopper with respect to the item via a user device of the online shopper. The user device of the online shopper is located outside of the retail store. The item tracker system transmits the status of the item to the user device of the in-person shopper for output to the in-person shopper.

12 Claims, 7 Drawing Sheets

(51) Int. Cl.
*G06Q 10/08* (2012.01)
*G06Q 30/02* (2012.01)
*G02B 27/00* (2006.01)
*G06F 3/01* (2006.01)
*G06F 16/9538* (2019.01)

(52) U.S. Cl.
CPC ....... *G06F 16/9538* (2019.01); *G06Q 10/087* (2013.01); *G06Q 30/0202* (2013.01); *G06Q 30/0633* (2013.01); *G06Q 30/0639* (2013.01); *G06Q 30/0222* (2013.01); *G06Q 30/0223* (2013.01); *G06Q 30/0235* (2013.01); *G06Q 30/0643* (2013.01)

(58) Field of Classification Search
CPC ........... G06Q 30/0222; G06Q 30/0223; G06Q 30/0235; G06Q 30/0643; G02B 27/0093; G06F 3/013; G06F 16/9538
See application file for complete search history.

(56) References Cited

U.S. PATENT DOCUMENTS

| | | |
|---|---|---|
| 2011/0214082 A1 | 9/2011 | Osterhout et al. |
| 2011/0264555 A1* | 10/2011 | Turner-Rielle ........ G06Q 30/06 705/26.8 |
| 2013/0211953 A1* | 8/2013 | Abraham ........... G06Q 30/0633 705/26.8 |
| 2013/0286004 A1 | 10/2013 | McCulloch et al. |
| 2014/0379536 A1 | 12/2014 | Varma et al. |
| 2015/0186978 A1 | 7/2015 | Prindle |
| 2019/0244248 A1* | 8/2019 | Purves ................... G06F 3/011 |

OTHER PUBLICATIONS

Here's How Packaging Manufacturers are using Augmented Reality, http://www.augment.com/blog/heres-packaging-manufacturers-using-augmented-reality/, 2020, 3 pages.
Augmented Reality Is Set to Transform Fashion and Retail, https://www.forbes.com/sites/rachelarthur/2017/10/31/augmented-reality-is-set-to-transform-fashion-and-retail/ - 2884afcc3151, 2017, 5 pages.
Augmented Reality in Retail Market Worth 7,951.2 Million USD by 2023, https://www.prnewswire.com/news-releases/augmented-reality-in-retail-market-worth-7-951-2-million-usd-by-2023-817803936.html, 2018, 5 pages.

* cited by examiner

SYNCHRONIZING ONLINE AND RETAIL SHOPPING EXPERIENCES FOR LIMITED STOCK PRODUCTS

BACKGROUND

The present invention generally relates to computer processing, and more specifically, to synchronizing online and retail shopping experiences for limited stock products.

Today, product sellers often have multiple channels for selling their products including retail stores and online shopping. In many scenarios, when limited stock items are to be cleared from a retail store, the retail store sends announcements or offers (e.g., discounts, notices that the supply is limited, etc.) about the limited stock products. The seller has a choice of whether to offer the product exclusively online or exclusively in a retail store. Thus, depending on the channel selected by the seller, the customer has to visit the retail store in order to buy the items or alternatively, the customer can only purchase the items online. It is currently not possible to provide both online shopping and retail store shopping in parallel for the same limited stock items because there is no way to synchronize or to account for an online customer and a retail store customer shopping for the same product at the same time. Providing both channels in overlapping timeframes can result in a retail customer selecting a product in order to review the suitability of the product (e.g., by trying it on if the product is clothing) and, in the meantime an online customer may purchase the product that the retail customer is evaluating for purchase.

SUMMARY

Embodiments of the present invention are directed to synchronizing online and retail shopping experiences for limited stock products. A non-limiting example computer-implemented method includes receiving, by an item tracking system, a request for a status of an item in a retail store, the request received from a user device of an in-person shopper located in the retail store, the status indicating whether the item is currently available for purchase by the in-person shopper. It is determined, by the item tracking system, the status of the item, the determining is based at least in part on whether an action was taken by an online shopper with respect to the item via a user device of the online shopper. The user device of the online shopper is located outside of the retail store. The item tracker system transmits the status of the item to the user device of the in-person shopper for output to the in-person shopper.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
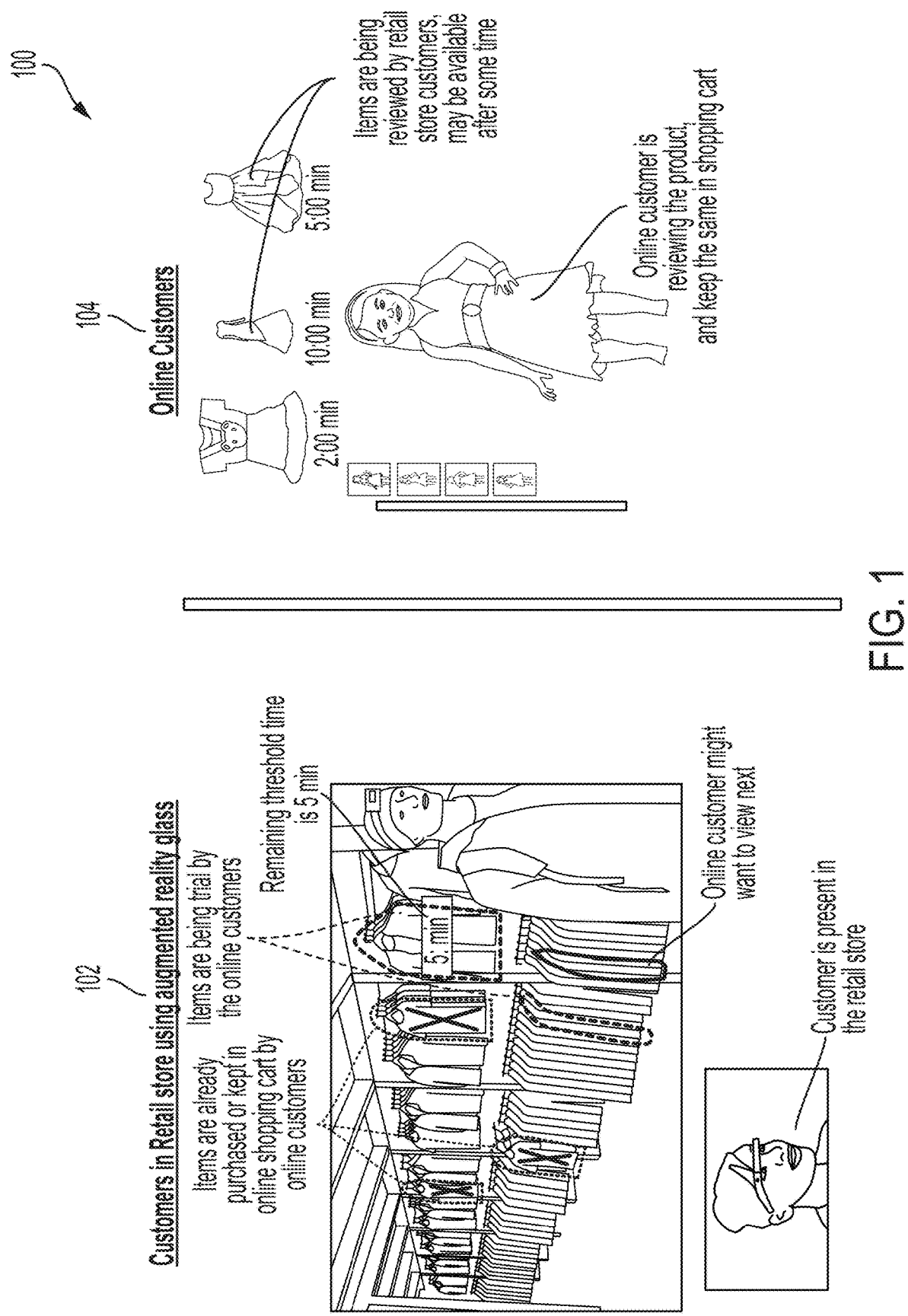
FIG. 1 depicts a block diagram of a view of a retail store customer and an online customer according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide a synchronized online and retail shopping experience for limited stock products in a retail store. One or more embodiments of the present invention allow depleting stock and stock that will be un-replenished (e.g., limited stock) to be available for sale in two or more places at once, such as in-person through an augmented reality (AR) interface in a retail store and online through a laptop device remote from the retail store.

In accordance with one or more embodiments of the present invention, customers present in a retail store use augmented reality (AR) glasses, or goggles, to visualize the limited stock items which are being reviewed and/or selected for purchase by online customers. Accordingly, the customers present in the retail store can identify which products can't be reviewed (e.g., inspected or tried on) for the time being or that can't be purchased because they have been selected for purchase by an online customer. Similarly, if a limited stock product is currently being reviewed or in the shopping cart of a customer present in the retail store, then the online customer will not be able to view or select the product for review or purchase. In accordance with one or more embodiments of the present invention, the number of a particular type of limited stock product will automatically be updated for the online customers.

In accordance with one or more embodiments of the present invention, an intelligent integrated shopping system analyzes the behavior of the online customers, their personalized information, historical buying patterns, etc. to predict which limited stock items are likely to be reviewed in the near future by the online customers. The AR systems of the customers present in retail stores can highlight the items which are predicted to be selected by the online customer in the future (e.g., in the next 30 seconds, in the next minute, in the next 20 minutes, etc.). This can allow the retail customer to take priority over the online customer by alerting the retail customer and giving them a chance to select the item for review before it is selected for review or purchase by the online customer.

In accordance with one or more embodiments of the present invention, a camera(s) installed in the retail store and/or a sensor(s) (e.g., an Internet of Things (IoT) sensor) is used to predict the behavior of the customers present in the retail store. This behavior prediction can include a prediction of which items are likely to be selected in the near future by the retail store customer. In accordance with one or more embodiments, this predictive information can be provided to the online customer to give them priority over the in-store customer. In accordance with one or more other embodiments, the predictive information can be provided to both the online and the in-store customer to provide them both with information about limited stock products which may be of interest to other customers.

The intelligent integrated shopping system described herein can also provide a threshold limit of time to the online customer to hold or to review any item, and during the threshold limit of time, the product is highlighted in the AR glasses of an in-store customer(s) as being unavailable for selection. In addition, an amount of time left in the threshold amount of time may be displayed via the AR glasses so that the in-store customer knows when the online customer must purchase the product or put it back for other customers to select. When the threshold amount of time expires, the product can become available to other customers for review, selection and/or purchase, including the customer present in the retail store.

In accordance with one or more embodiments of the present invention, the intelligent integrated shopping system recognizes each limited stock item and each customer individually, and identifies which items are selected by the online or in-store customers to ensure that there is no ambiguity in the selection of items. In accordance with one or more embodiments of the present invention, the customer that selects the product first (e.g., for review or for their shopping cart) is given priority to purchase the product.

As used herein, the terms "limited stock product" and "limited stock item" refer to an item that is tracked individually. A limited stock product may be a single product or one of a plurality (e.g., two, twenty, two hundred, one thousand) of the same type of product (e.g., a particular style of coat, a particular coat in size 8, or a particular model of an appliance, etc.). Typically, a limited stock item has a depleting stock that will not be replenished by the seller. Because a limited stock item is not being replenished, it becomes important to ensure that the same limited product being offered in multiple channels is not being purchased by multiple different customers.

Contemporary approaches do not allow a seller to provide synchronized shopping between customers in different shopping channels for limited stock products. As used herein, the term "channel" refers to a location where a product is being sold. Examples of different channels include a first retail store, a second retail store, and an online shopping website. Vendors with limited tock products typically select one channel (e.g., a particular retail store location or online) for each of the limited availability items to avoid any issues (e.g., customer satisfaction, accounting, inventory) that would be caused by two different customers purchasing or expecting to purchase the same item. Having to select a particular channel can limit the number of potential purchasers of the product, which may result in in taking longer to sell the product (when compared with using multiple channels) or may cause additional discounts in price to be required in order to sell the product due to the limited pool of potential purchasers.

One or more embodiments of the present invention address one or more issues of contemporary approaches by providing a synchronized shopping experience for customers who are using different purchasing channels to view (and potentially purchase) limited availability products. One or more embodiments of the present invention provide a technical solution that provides synchronization in real time, or near real time, between shoppers looking at the same products in different channels. This allows both in-store retail customers and online customers to shop together for limited stock products.

One or more embodiments of the present invention relate to tracking, synchronizing and managing competing requests against limited instances of goods (e.g., limited stock products) in a multi-channel retail system. In accordance with one or more embodiments of the present invention, customer actions with respect to a particular limited stock item are tracked and coordinated across both in-store and online customers. A status of a product at any point in time can be determined based on the detected actions and/or characteristics of a shopper and presented in real-time or near real-time to customers viewing the particular limited stock item. As used herein, the phrase "real-time or near real-time" refers to computer processing that appears to the user as happening at the same rate as an action by the user or another user, subject to any delays introduced by computing systems or networks. A status of a product can include, but is not limited to: the item is reserved by one customer and cannot be accessed by other customers; the item is on trial within a waiting area, fitting room, or just otherwise being reviewed by a customer and cannot be selected by other; the item is an item that a customer may want to view next.

The status of a product can be presented to an in-store customer via an AR overlay and viewed via AR googles worn by the in-store customer. The overlay can also include timing information such as, but not limited to, a timer that indicates an amount of time until the customer's hold on the product expires or an amount of time remaining that the item will only be available to in-store customers. Once the limited stock product has been purchased, it can be removed from the view of other customers. One of more embodiments of the present invention resolve ambiguity about the availability of an item being viewed simultaneously in-person and online, and allow shoppers in different channels to shop simultaneously for the same limited stock item(s).

One or more embodiments of the present invention can give the predictive habits of in-store shoppers priority over online shoppers. For example, if an in-store shopper is expected (e.g., based on a location of the shopper in the store, or a previous selection or purchase by the shopper, or other data about the shopper) to view or review a particular limited availability item next, then the particular item may appear to other shoppers (e.g., on line shoppers) as not currently being available, with timing information overlaid on the item or alternatively the item may not show up as being offered for sale online. In one or more embodiments of the present invention, the predictive habits of online shoppers or selected shoppers (online and/or in person) can be given priority over other shoppers.

In accordance with one or more embodiments of the present invention, items that are in an online shopping cart are prevented from being purchased by an in-person shopper. This can be performed for example, by the software code in a point of sale terminal such as a cash register. The software code can scan the barcode or other unique identifier attached to the items presented by the in-store customer for purchase, and if the unique identifier matches the unique identifier of a product in an online shopping cart, the sale to the instore customer cannot be completed. A message can be displayed via the point of sale terminal and the transaction can be denied. One or more embodiments of the present invention can be utilized to reduce competing limited stock item requests and associated adjustments based on user profiles. For example, frequent shoppers can be given priority over less frequent shoppers. Other categories of shoppers can also be implemented by one or more embodiments of the present invention.

One or more embodiments of the present invention can prioritize the purchase of a limited stock item by an in-store customer if an alternative product for an online customer exists. For example, the seller may be able to drop ship a similar (or same) type of item from another retail store location to facilitate the online transaction if the store is a national chain that might be able to handle the fulfilment request. This can allow the in-store customer to purchase the product that is in the retail store while at the same time allowing the online customer to obtain a similar product.

Turning now to FIG. 1, a block diagram 100 depicting an in-store customer view 102 and an online customer view 104 of limited stock items offered for purchase is generally shown in accordance with one or more embodiments of the present invention. FIG. 1 provides an example of how a customer present in a retail store can visualize which items are bought by online customers or are being used for trail/review by online customers, and at the same time online customers can also view activity by the in-store shopper.

As shown in the embodiment of FIG. 1, the in-store customer view 102 is the view that is seen by a customer that is in the retail store (an "in-store" or "in-person" shopper) viewing products offered for sale via AR glasses. In the embodiment shown in FIG. 1, the customer can see, via the AR glasses, which items in the retail store have been already purchased or are in an online shopping cart of one or more online customers. In addition, the in-person shopper, or customer, can see items that are in currently in trial or being reviewed by an online customer(s) as well as an amount of time left for the online customer to complete the trial of the particular product. Prior to the threshold time completing, the other shopper who is holding the item for trial must put the item back for other shoppers to purchase or must purchase the product. In accordance with one or more embodiments of the present invention, the shopper must put the product in a shopping cart of the shopper before the threshold time has expired indicating an intent to purchase the product. In accordance with one or more embodiments of the present invention, the amount of time that a limited availability product can stay in a shopping cart can also be limited (e.g., by time or until an online shopper leaves the shopping application). Also shown in the in-store customer view 102 of FIG. 1 is a prediction of items that the online shopper may want to view next to give the in-store shopper a chance to select the product first.

The online customer view 104 shown in FIG. 1 includes an item that the online customer is currently reviewing (e.g., the online customer has put the item in their online shopping cart). In the embodiment shown in FIG. 1, this item will be displayed in the in-store customer view 102 as an item that is in trial by an online shopper, optionally along with an amount of time left for the online customer to purchase the product or to release it for selection by other prospective purchasers. The online customer view 104 of FIG. 1 also shown items that are currently being reviewed by an in-store customer(s) along with the amount of time left before the in-store customer must either purchase or release the item for selection by other prospective purchasers.

Figure 2:
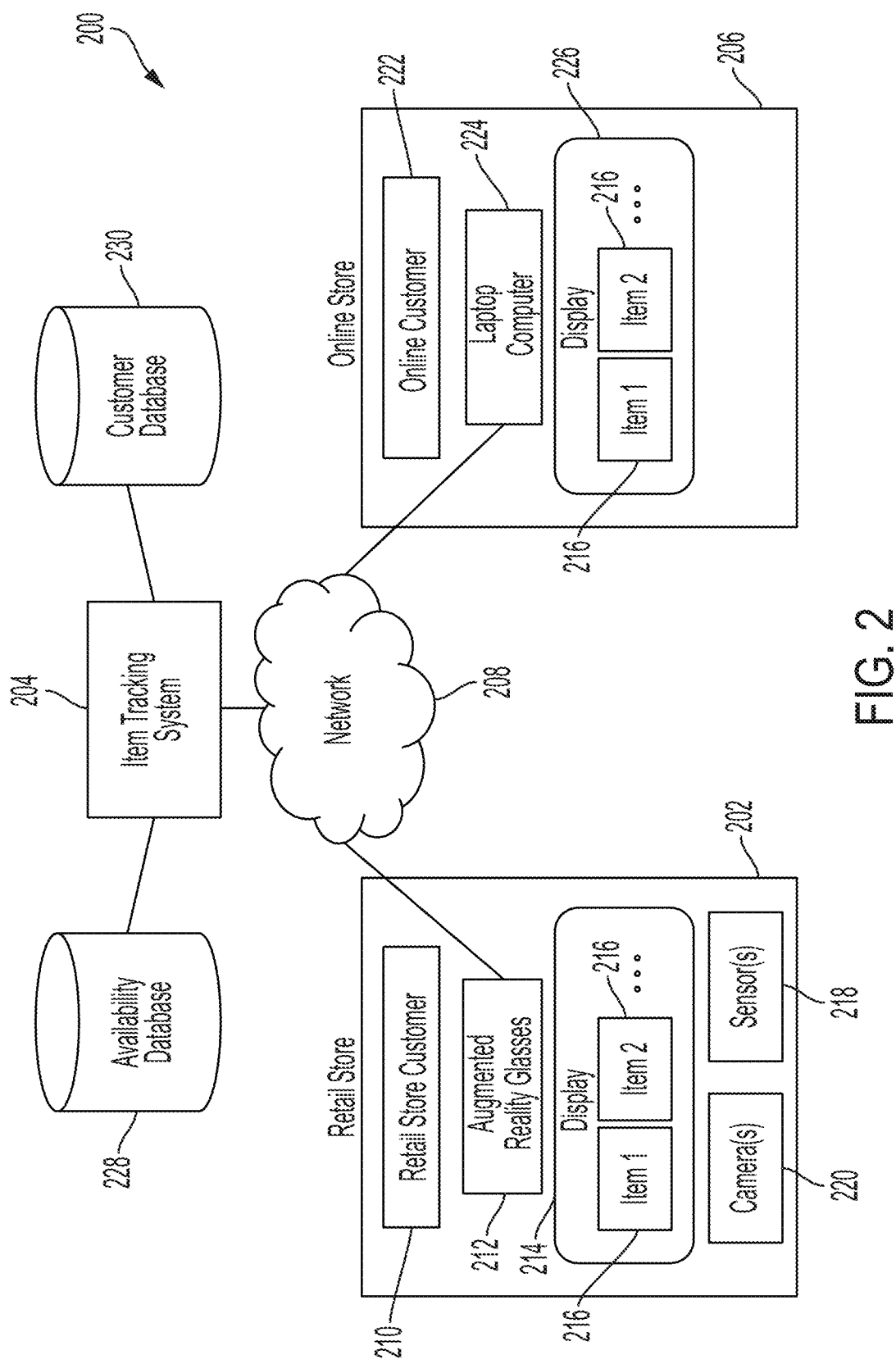
FIG. 2 depicts a block diagram of a system for synchronizing online and retail shopping experiences for limited stock products according to one or more embodiments of the present invention.

Turning now to FIG. 2, a block diagram 200 of a system for synchronizing online and retail shopping experiences for limited stock products is generally shown in accordance with one or more embodiments of the present invention. The components shown in FIG. 1 include an item tracking system 204, an availability database 228, a customer database 230, a retail store 202, and an online store 206.

The item tracking system 204 shown in FIG. 2 coordinates the tracking, synchronizing, and managing of competing requests against limited instances of goods in a multi-channel retail system. In FIG. 2 the multiple channels include a retail store 202 and an online store 206. One skilled in the art will appreciate that other embodiments may include synchronization across multiple retail stores 202 and/or multiple online stores 206, and that other embodiments may include only retail stores 202 or only online stores 206.

The retail store 202 shown in FIG. 2 includes a retail store customer 210 (also referred to herein as an "in-store shopper") who is wearing AR glasses 212. One skilled in the art will appreciate that other types of user devices may be used by the retail store customer to view the items 216 and status information overlaid on the items 216. The AR glasses 212 are connected to the item tracking system 204 via network 208. Items 216 are physically located in the retail store 202 and viewed by the retail store customer 210 via a display 214 (e.g., on the AR glasses 212). The retail store 202 shown in FIG. 2 also includes one or more cameras 220 and sensors 218 that can be used in one or more embodiments to recognize items or locations of the customers in the retail store 202. In accordance with one or more embodiments of the present invention, a sensor 218 such as a scanner is located on the AR glasses 212 and as the retail store customer 210 scans the products in the store, the barcodes or RFIDs (with unique product identifiers) attached to the products are received by the sensor. These identifiers are sent to the item tracking system 204 to obtain status information for output to the display 214. Alternatively, or in addition, a camera 220 can be attached to the AR glasses 212 and used to determine, for example, that the retail store customer 210 has picked up an item, that the retail store customer 210 is at a particular location in the store and/or the unique identifier of the item 216.

In accordance with one or more embodiments of the present invention, each and every item 216 in the retail store 202 is identified individually and uniquely using any technology known in the art such as, but not limited to IoT sensors 218 and/or RFID based systems. In accordance with one or more embodiments of the present invention, a tag that includes a sensor or barcode or RFID tag or other means of identification is attached to each item 216. The identifiers can be added, for example, to a price tag that is already attached to the item 216. The means of identification can include an item already present on a standard price tag such as, but not limited to, a barcode. Sensors or other means known in the art can be used to detect the identifiers and uniquely identify each item. In accordance with one or more other embodiments of the present invention only a subset of the items 216 which includes the limited availability, or limited stock, items 216 is identified individually and uniquely. Each retail store customer 210 is also identified uniquely based, for example on facial recognition or device tracking. When a retail store customer 210 enters the retail store 202 they are given the AR glasses 212 and tracking of the AR system can also be used to identify the retail store customer 210

The online store 206 shown in FIG. 2 includes an online customer 222 who is using a laptop computer 224 for shopping. The online customer 222 views the items 216 via a display 214 (e.g., on the laptop computer). One skilled in the art will appreciate that any type of shopping platform can be used and that other types of user devices may be used by the online customer to view the items 216 such as, but not limited to a desktop computer, a mobile telephone, and/or a smartwatch.

The status of the limited availability items 216 is synchronized in real-time or near real-time by the item tracking system 204. Each time that an action is detected at the retail store 202 or the online store 206 with respect to a limited stock product that is being sold via multiple channels, the item tracking system 204 is notified via the network 208. In accordance with one or more embodiments of the present invention, the notification includes the unique identifier of the product, the unique identifier of the customer, and the detected activity. The item tracking system 204 processes the data received from the different channels and sends updates to the channels so that they reflect the current status of the products. The update can include the unique identifier of the product, the status of the product, and optionally the unique identifier of the customer. In accordance with one or more embodiments of the present invention, different customers receive different statuses depending, for example, on characteristics of the customer and/or the channel that they are shopping from.

In accordance with one or more embodiments of the present invention, the availability database 228 includes an entry for each item that is being tracked individually. Each entry can include the unique identifier of the item being tracked as well as a current status or last activity detected with respect to the limited stock product. The entries can also include the unique identifier of the shopper(s), or customer(s), taking the detected action(s).

In accordance with one or more embodiments of the present invention, the customer database 230 includes an entry for each customer that is accessing products being tracked by the item tracking system 204. Each entry can include the unique identifier of the customer as well as characteristics of the customer such as, but not limited to: products or types of products bought in the past, items currently being reserved or held by the customer, purchasing habits of the customer, rewards programs, etc. In accordance with one or more embodiments of the present invention, online customers are identified uniquely based on their login identifiers and in-store shoppers are uniquely identified based on facial recognition.

In accordance with one or more embodiments of the present invention, when limited stock products are to be sold within a limited time frame, the products will be made available in an online shopping system, such as online store 206, and at the same time the products will be available in a retail store, such as retail store 202, for selling. In accordance with one or more embodiments of the present invention, the online store 206 stores a digital copy or digital detail of each item so that virtual trial of the product can be done in the online portal of the online store 206. When the online customer 222 selects any product, or item 216, from the shopping portal, then the item tracking system 204 is notified by the online store 206, via the laptop computer 224 and network 208. The item tracking system 204 recognizes the item (e.g., based on its unique identifier), and the camera and IoT enabled system in the retail store 202 (e.g., on the AR glasses 212) will also recognize the same item in the retail store 202.

When the retail store customer 210 enters into the retail store 202, the AR glasses connect to the item tracking system 204 and display the status of the limited stock items 216 to the retail store customer 210 indicating, for example, items 216 that have already been selected by the online customer 222.

In accordance with one or more embodiments of the present invention, the item tracking system 204 identifies the online customer detail, current behavior, etc. based on detected activities and data stored in the customer database 230. Based on this information, the item tracking system 204 predicts other products that the customer may want to explore or purchase. Similarly, based on camera data, sensor data, and historical buying patterns, the item tracking system 204 can identify items 216 that are likely to be purchased or view by the retail store customer 210. The predicted product review(s) by the retail store customer 210 and online customer 222 can be highlighted to each other via their respective displays 214 226.

In accordance with one or more embodiments of the present invention, the item tracking system 204 is given a threshold limit of time to keep the item 216 in the shopping cart, and if the online customer 222 examines or reviews item 216 after the threshold amount of time has expired, then the item tracking system 204 will be make the product available to the retail store customer 210 for selection.

In accordance with one or more embodiments of the present invention, by analyzing the feed of information from the retail store customer 210 and the online customer 222, the item tracking system 204 can identify which customer has selected any product first, and can assign the threshold limit of time for the customer to either purchase or to remove the item from their shopping cart. The threshold limit of time can be allocated, for example, based on type of product and cost of the product. For example, apparel may have a longer threshold than cosmetic cream. If the customer holds the product for more than threshold limit of time, then the product can be made available to other customers for selection.

In accordance with one or more embodiments of the present invention, the physical shopping cart at the retail store 202 has an IoT sensor so that the item tracking system 204 knows which item(s) is kept in the shopping cart by the retail store customer(s) 210, and at the same time the item tracking system is identifying which items are being trialed/reviewed by the customers present in the retail store 202. The vendor can also view the current status of the items 216 such as which items are already selected, which items were bought by the online customer(s) 222 vs retail store customers 210, etc.

One or more embodiments of the present invention provide a mechanism to reduce competing stock item requests including monitoring whether a retail store customer 210 tries to look for an item that's already been selected/added to a cart by an online customer 222. In accordance with one or more embodiments of the present invention, depending on the store rewards/loyalty programs, the item tracking system 204 takes one of the following steps: (a) If the retail store customer 210 is part of a premium rewards/loyalty program, the system prompts the online customer 222 with incentives at the time of check out, asking whether they would opt out of the "limited stock item" purchase in favor of gaining an "xx %" rebate on their next purchase, if the online user agrees, the system credits the online customer 222 with the rebate and offers the limited stock item to the premium program user who is in-store (the retail store customer 210); or (b) If the retail store customer 210 is not part of a premium rewards/loyalty program, then the item tracking system 204 offers to make a "bid" for the limited stock item to the customer 222 if the retail store customer 210 agrees to sign up for the program. In accordance with one or more embodiments of the present invention, the item tracking system 204 offers similar incentives to a retail store customer 210 in when the online customer 222 is a long-term, high-value, recurring customer.

After making several such incentive offers to in-store and/or online users and gauging the final outcome of the incentive (accepted or rejected), the item tracking system 204 can derive or update user profiles stored in the customer database 230. For example, the item tracking system 204 may notice that users with a particular profile, or combination of characteristics (e.g., a specified age range and salary range) tend to reject any rebate offers and instead go ahead with their purchase, whereas users in a different demographic or having different characteristics tend to be more flexible and accept the rebate (and buy a similar item/different brand, etc.). Based on the customer profiles in the customer database 230, the item tracking system 204 starts to inform/adapt its incentivization method/calculation to adjust the rebate offers based on the customer demographic. As it gathers more feedback (offer accepted vs rejected), it continues to refine the user profiles over time.

Figure 5:
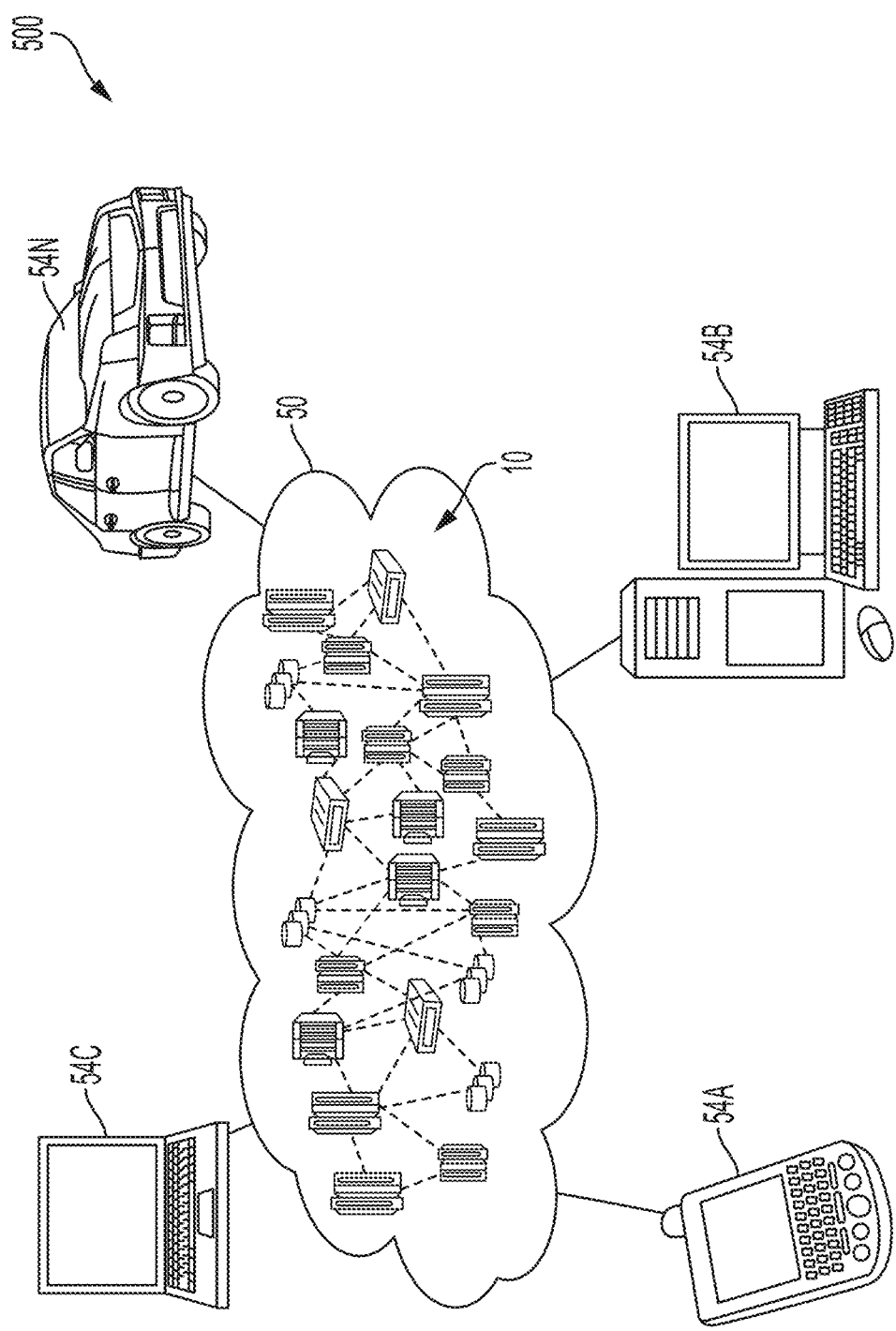
FIG. 5 depicts a cloud computing environment according to one or more embodiments of the present invention.
Figure 7:
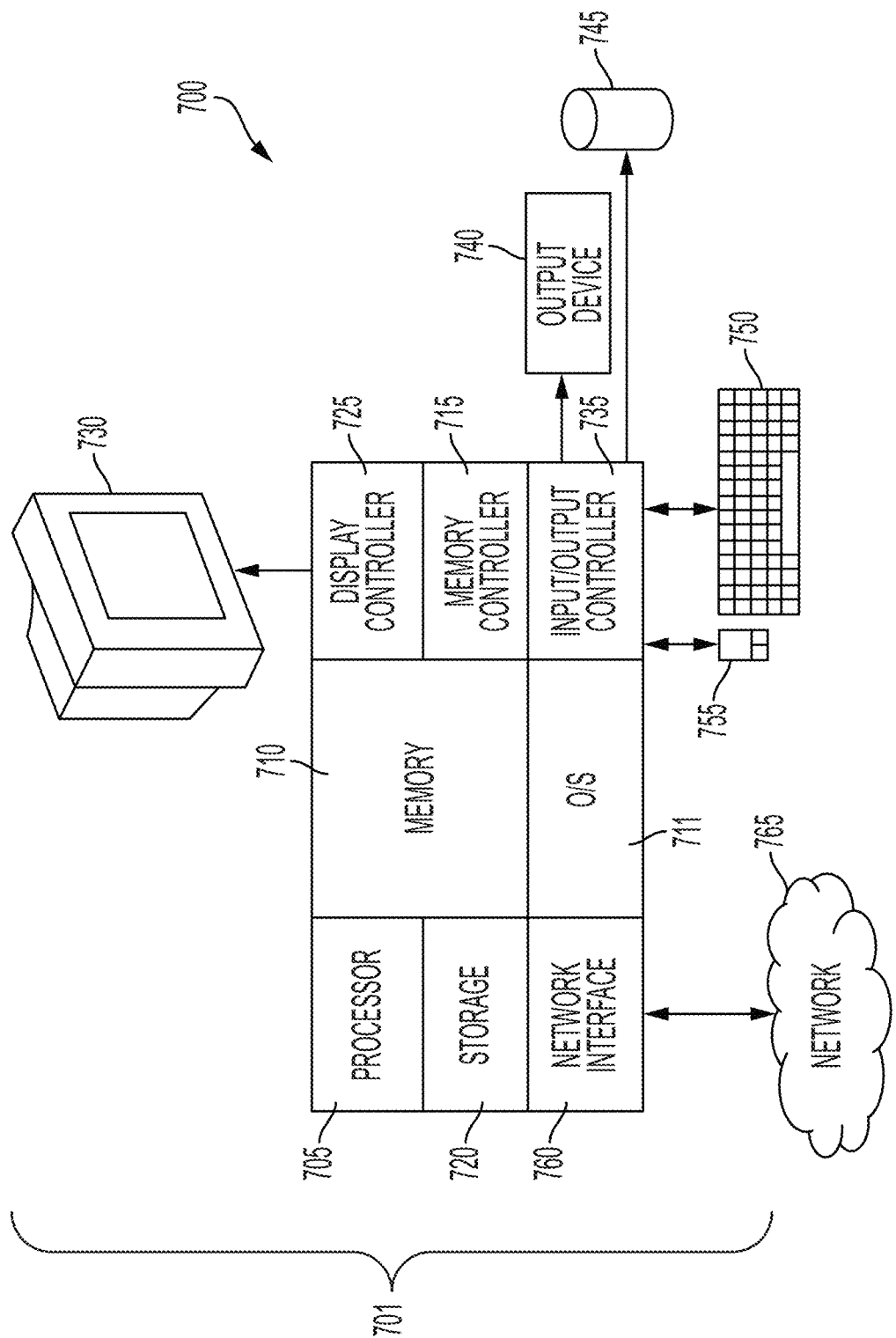
FIG. 7 illustrates a system for synchronizing online and retail shopping experiences for limited stock products according to one or more embodiments of the present invention.

All or a subset of the processing described in reference to the item tracking system 204 may be performed by computer instructions executing on a processor 705 located on computer 701 of FIG. 7 and/or on a processor located on a cloud computing node 10 of FIG. 5. In accordance with one or more embodiments of the present invention, at least a subset of the processing performed by the item tracking system 204 is performed by processor located on one or more user devices such as AR glasses 212 and/or laptop computer 224 of FIG. 2.

The embodiments described herein with respect to block diagram 200 of FIG. 2 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
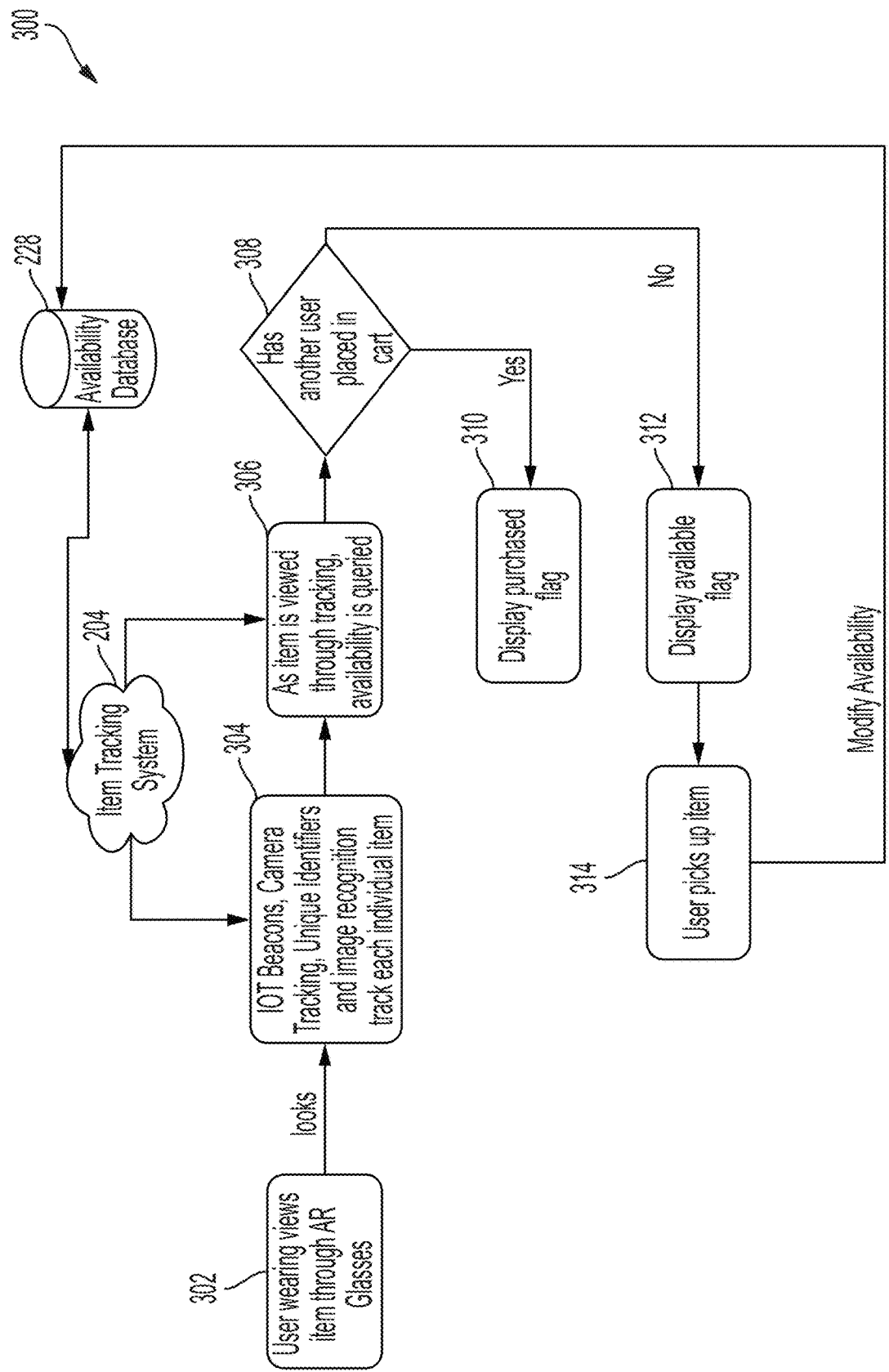
FIG. 3 depicts a flow diagram of a method for providing a synchronized online and retail shopping experience for limited stock products to an in-person shopper according to one or more embodiments of the present invention.

Turning now to FIG. 3, a flow diagram of a method 300 for providing a synchronized online and retail shopping experience for limited stock products to an in-person shopper is generally shown in accordance with one or more embodiments of the present invention. All or a portion of the processing shown in FIG. 3 can be performed, for example, by item tracking system 204 of FIG. 2 executing on a processor 705 located on computer 701 of FIG. 7 or on a processor located on a cloud computing node 10 of FIG. 5, and/or on AR glasses 212 of FIG. 2.

At block 302, a user, such as retail store customer 210 of FIG. 2, views a limited availability product via a virtual reality device such as AR glasses 212 of FIG. 2. As described in block 304, sensors and cameras use the unique identifiers associated with each item and image recognition to track each individual limited stock item in the retail store. As shown in FIG. 3, the tracking is performed using item tracking system 204 of FIG. 2 and availability database 228 of FIG. 2. At block 306, a limited stock item being tracked by the system is viewed through the virtual reality device and its availability, or status, is requested from the item tracking system 204.

At block 308 of FIG. 3 it is determined whether another user has placed the limited stock item in their cart. If it is determined, at block 308, that another user has placed the item in their cart, then block 310 is performed and the display of the virtual reality device is updated to indicate that the item has been purchased. If it is determined, at block 308, that another user has not placed the item in their cart, then block 312 is performed and the display of the virtual reality device is updated to indicate that the item is available for purchase. At block 314 the in-store customer picks up the item and the availability of the item is modified in the availability database 228.

The process shown in FIG. 3 uses a simplified process with two statuses: available for purchase and not available for purchase. These statuses are determined based on one action or activity of the user: whether a user has put the item in their shopping cart. As described previously other statuses (e.g., not available for purchase can be broken down into currently being reviewed, selected for purchase, and purchased) can also be tracked and displayed along with timing information. In addition, other activities of a user may be tracked such as, but not limited to viewed product, review product (e.g., try product on), and remove item from cart. Further, in addition to activities, characteristics of customers, stored for example in a customer database such as customer database 230 of FIG. 2, can be used to determine the status of an item. One skilled in the art will appreciate that any number of combinations of activities and customer characteristics can be combined to generate a large number of discrete statuses about a limited availability product.

The process flow diagram of FIG. 3 is not intended to indicate that the operations of the method 300 are to be executed in any particular order, or that all of the operations of the method 300 are to be included in every case. Additionally, the method 300 can include any suitable number of additional operations Turning now to FIG. 4, a flow diagram of a method 400 for providing a synchronized online and retail shopping experience for limited stock products to an online shopper is generally shown in accordance with one or more embodiments of the present invention. All or a portion of the processing shown in FIG. 4 can be performed, for example, by item tracking system 204 of FIG. 2 executing on a processor 705 located on computer 701 of FIG. 7 or on a processor located on a cloud computing node 10 of FIG. 5, and/or on laptop computer 224 of FIG. 2.

Figure 4:
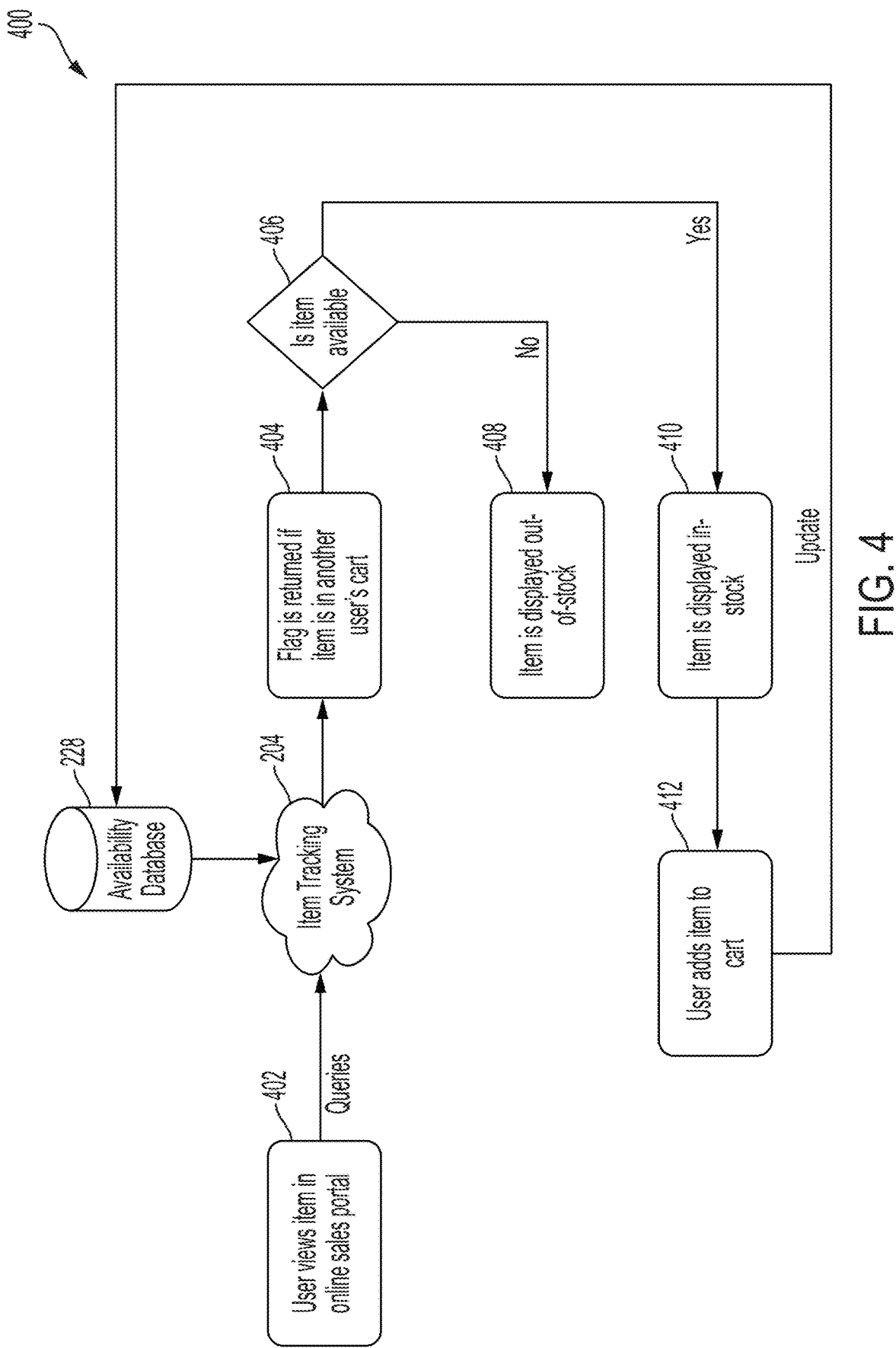
FIG. 4 depicts a flow diagram of a method for providing a synchronized online and retail shopping experience for limited stock products to an online shopper according to one or more embodiments of the present invention.

At block 402, a user, such as online customer 222 of FIG. 2, views a limited availability product via an online sales portal via a user device such as laptop computer 224 of FIG. 2. As shown in FIG. 4, the item tracking is performed using item tracking system 204 of FIG. 2 and availability database 228 of FIG. 2. As shown in FIG. 4 the user queries the item tracking system 204 and a block 404 a flag is returned if the specified item is in another user's shopping cart. At block 406 it is determined whether the item is available (e.g., whether another user has placed the limited stock item in their cart). If it is determined, at block 308, that another user has placed the item in their cart, then block 408 is performed and the display of the user device is updated to indicate that the item is out of stock. If it is determined, at block 406, that the item is available, then block 410 is performed and the display of the user device is updated to indicate that the item is in stock. At block 412 the online customer adds the item to their cart and the availability of the item is modified in the availability database 228.

The process shown in FIG. 4 uses a simplified process with two statuses: in stock and out of stock. These statuses are determined based on one action or activity of the user: whether another user has put the item in their shopping cart. As described previously other statuses (e.g., not available for purchase can be broken down into currently being reviewed, selected for purchase, and purchased) can also be tracked and displayed along with timing information. In addition, other activities of a user may be tracked such as, but not limited to viewed product, review product (e.g., try product on), and remove item from cart. Further, in addition to activities, characteristics of customers, stored for example in a customer database such as customer database 230 of FIG. 2, can be used to determine the status of an item. One skilled in the art will appreciate that any number of combinations of activities and customer characteristics can be combined to generate a large number of discrete statuses about a limited availability product.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The processes shown in FIG. 3 and FIG. 4 are performed at the same time to synchronize shopping activities for limited stock items between shoppers at the retail store 202 and the online store 206.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
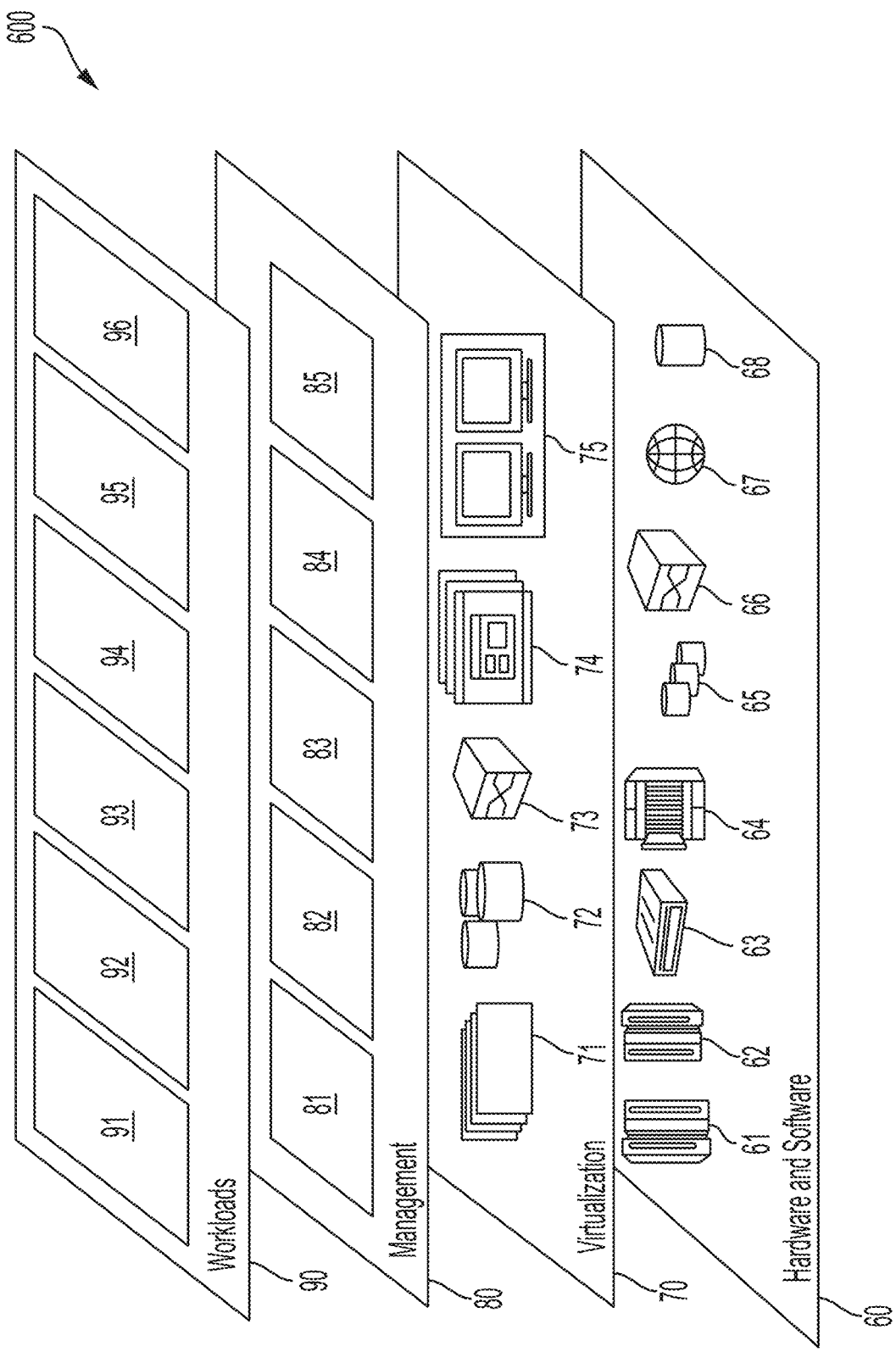
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Turning now to FIG. 7, a computer system for synchronizing online and retail shopping experiences for limited stock products is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 700 therefore may include general-purpose computer or mainframe 701 capable of running multiple instances of an O/S simultaneously.

In one or more exemplary embodiments of the present invention, in terms of hardware architecture, as shown in FIG. 7, the computer 701 includes one or more processors 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In accordance with one or more embodiments of the present invention, the memory 710 may include multiple logical partitions (LPARs) each running an instance of an operating system. The LPARs may be managed by a hypervisor, which may be a program stored in memory 710 and executed by the processor 705.

In one or more exemplary embodiments of the present invention, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730.

In one or more exemplary embodiments of the present invention, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute instructions stored within the memory 710, to communicate data to and from the memory 710, and to generally control operations of the computer 701 pursuant to the instructions. In accordance with one or more embodiments of the present invention, computer 701 is an example of a cloud computing node 10 of FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   transmitting to an item tracking system, a request for a status of an item in a retail store, the request transmitted by a user device of an in-person shopper located in the retail store, the status indicating whether the item is currently available for purchase by the in-person shopper, the user device of the in-person shopper comprising augmented reality (AR) glasses that the in-person shopper uses to view the item;
   receiving the status of the item from the item tracking system, wherein the status of the item is determined by the item tracking system based at least in part on whether an action was taken by an online shopper with respect to the item via a user device of the online shopper, the user device of the online shopper located outside of the retail store; and
   outputting the status of the item for viewing by the in-person shopper via the AR glasses.

2. The method of claim 1, wherein the action taken by the online shopper comprises placing the item in an online shopping cart of the online shopper and the status comprises a remaining amount of time for the online shopper to either purchase the item or for the item to become available for purchase.

3. The method of claim 1, wherein the status of the item comprises a prediction of a next action by the online shopper with respect to the item.

4. The method of claim 1, wherein the item tracking system tracks and determines the status of a plurality of items in a plurality of retail stores and synchronizes actions by a plurality of in-person and online shoppers with respect to the plurality of items.

5. The method of claim 1, wherein the transmitting and receiving are performed periodically.

6. The method of claim 1, wherein the action taken by the online shopper is selected from the group consisting of reviewing the item, adding the item to a shopping cart of the online shopper, and purchasing the item.

7. The method of claim 1, wherein an incentive is provided to one or both of the in-person shopper and the online shopper to take a specified action with respect to the item.

8. A system comprising:
   augmented reality (AR) glasses comprising one or more processors for executing computer-readable instructions, the computer-readable instructions controlling the one or more processors to perform operations comprising:
      transmitting to an item tracking system, a request for a status of an item in a retail store, the request transmitted by the AR glasses, the AR glasses worn by an in-person shopper located in the retail store, the status indicating whether the item is currently available for purchase by the in-person shopper;
      receiving the status of the item from the item tracking system, wherein the status of the item is determined, by the item tracking system based at least in part on whether an action was taken by an online shopper with respect to the item via a user device of the online shopper, the user device of the online shopper located outside of the retail store; and
      outputting the status of the item for viewing by the in-person shopper via the AR glasses.

9. The system of claim 8, wherein the action taken by the online shopper comprises placing the item in an online shopping cart of the online shopper and the status comprises a remaining amount of time for the online shopper to either purchase the item or for the item to become available for purchase.

10. The system of claim 8, wherein the status of the item comprises a prediction of a next action by the online shopper with respect to the item.

11. The system of claim 8, wherein the item tracking system tracks and determines the status of a plurality of items in a plurality of retail stores and synchronizes actions by a plurality of in-person and online shoppers with respect to the plurality of items.

12. A computer program product comprising a computer-readable storage medium having program instructions embodied therewith, the program instructions executable by one or more processors to cause the one or more processors to perform operations comprising:
   transmitting to an item tracking system, a request for a status of an item in a retail store, the request transmitted by a user device of an in-person shopper located in the retail store, the status indicating whether the item is currently available for purchase by the in-person shopper, the user device of the in-person shopper comprising augmented reality (AR) glasses that the in-person shopper uses to view the item;
   receiving the status of the item from the item tracking system, wherein the status of the item is determined by the item tracking system based at least in part on whether an action was taken by an online shopper with respect to the item via a user device of the online shopper, the user device of the online shopper located outside of the retail store; and outputting the status of the item for viewing by the in-person shopper via the AR glasses.

\* \* \* \* \*